United States Patent [19]

Godwin et al.

[11] Patent Number: 5,067,039

[45] Date of Patent: Nov. 19, 1991

[54] HIGH TRACK DENSITY MAGNETIC MEDIA WITH PITTED OPTICAL SERVO TRACKS AND METHOD FOR STAMPING THE TRACKS ON THE MEDIA

[75] Inventors: Jimmy D. Godwin; Stephen P. Williams, both of San Jose, Calif.

[73] Assignee: Insite Peripherals, Inc., San Jose, Calif.

[21] Appl. No.: 424,658

[22] Filed: Oct. 20, 1989

[51] Int. Cl.$^5$ .......................... G11B 5/596; G11B 5/82
[52] U.S. Cl. .................................. 360/135; 360/77.03; 369/14; 369/275.1
[58] Field of Search ...................... 360/77.03, 131, 135; 369/14, 275.1, 275.3, 275.4

[56] References Cited

U.S. PATENT DOCUMENTS

| | | | |
|---|---|---|---|
| 4,315,283 | 2/1982 | Kiujo | 358/342 |
| 4,558,383 | 12/1985 | Johnson | 360/77.03 |
| 4,587,579 | 5/1986 | Cocke et al. | 360/75 |
| 4,633,451 | 12/1986 | Ahu et al. | 369/14 |
| 4,911,967 | 3/1990 | Lazzari | 360/135 |

OTHER PUBLICATIONS

J. Schneider, "Optical Servo Information on Magnetic Recording Disks", IBM Tech. Disc. Bulletin, vol. 16, No. 4, Sep. 1973, p. 1082.

A. S. Hoagland, "Optical Servo of Magnetic Recording", IBM Technical Disclosure Bulletin, vol. 20, No. 10, p. 4108, Mar. 1978.

D. A. Thompson, et al., "Embossed Servo Techniques for Floppy Disks", IERE Conference Proceedings, No. 43, p. 321, Jul. 1979.

N. Koshino and S. Ogawa, "Optical Method of the Head Positioning in Magnetic Disk Systems", reprint from IEEE Transactions on Magnetics, vol. Mag-16, No. 5, Sep. 1980.

K. D. Broadbent, "A Review of the MCA Disco-Vision System", Journal of The SMPTE, vol. 84, pp. 554+, 1974.

R. E. Acosta, et al., "Floppy Disk Embossing for Servo Applications", IBM Technical Disclosure Bulletin, vol. 21, No. 10, pp. 4259–4260, Mar. 1979.

J. S. Winslow, "Mastering and Replication of Reflective Videodisks", IEEE Transactions on Consumer Electrons, pp. 318+, Nov. 1976.

B. Jacobs, "Laser Beam Recording of Video Master Disks", Applied Optics, vol. 17, pp. 2001–2006, Jul. 1, 1978.

"Daicel Leads Development of the Optical Memory Disk Supported by Chemical Technology", OEP, pp. 48–49 (May 1987).

R. I. Potter, "Capacitive Servoing on Topographic Variations", IBM Technical Disclosure Bulletin, vol. 21, No. 6, p. 2506, Nov. 1978.

J. Isailovic, *Videodisc and Optical Memory Systems*, pp. 7–8, 1985.

Primary Examiner—Aristotelis Psitos
Assistant Examiner—David L. Robertson
Attorney, Agent, or Firm—Thomas E. Schatzel

[57] ABSTRACT

A flexible magnetic medium having a plurality of optical servo tracks indelibly marked on the medium and a method for stamping the tracks on the medium. The optical servo tracks comprise a plurality of circular concentric regions positioned on a face of a floppy disk with each circular region comprising a plurality of pits. The optical servo tracks are imprinted on the floppy disk by placing a stamper disk bearing a template of the optical servo tracks in a hydraulic press and pressing the stamper disk and floppy disk together, typically under five to nine tons per square inch of pressure.

15 Claims, 2 Drawing Sheets

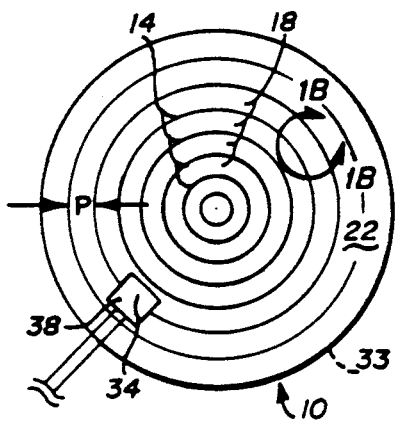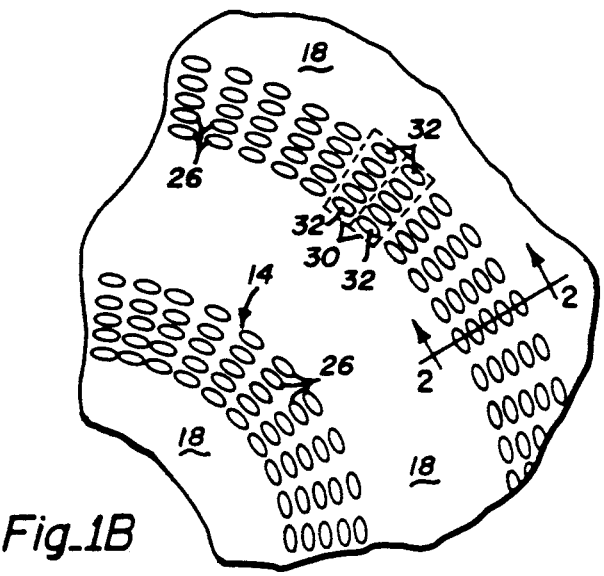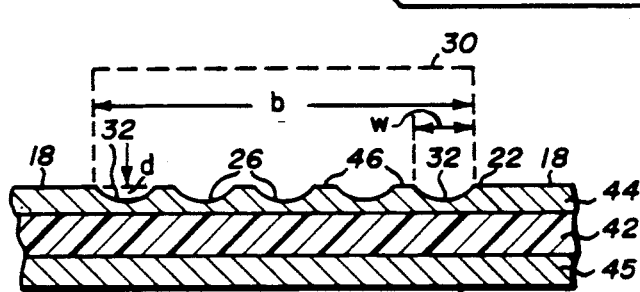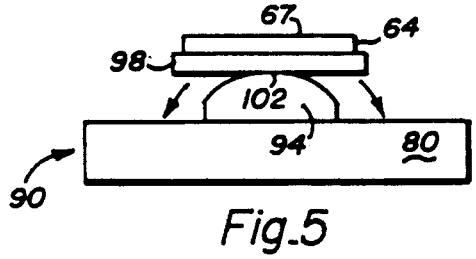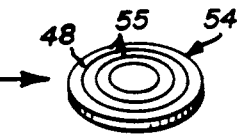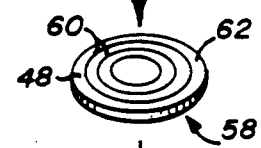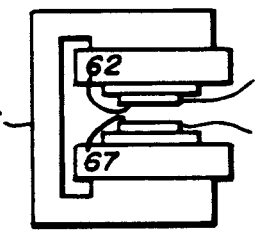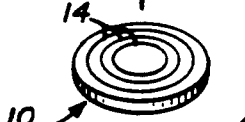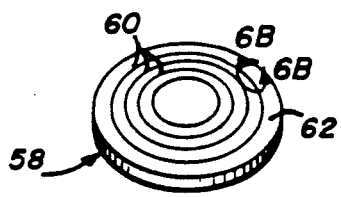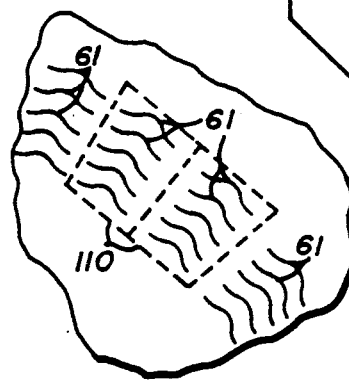

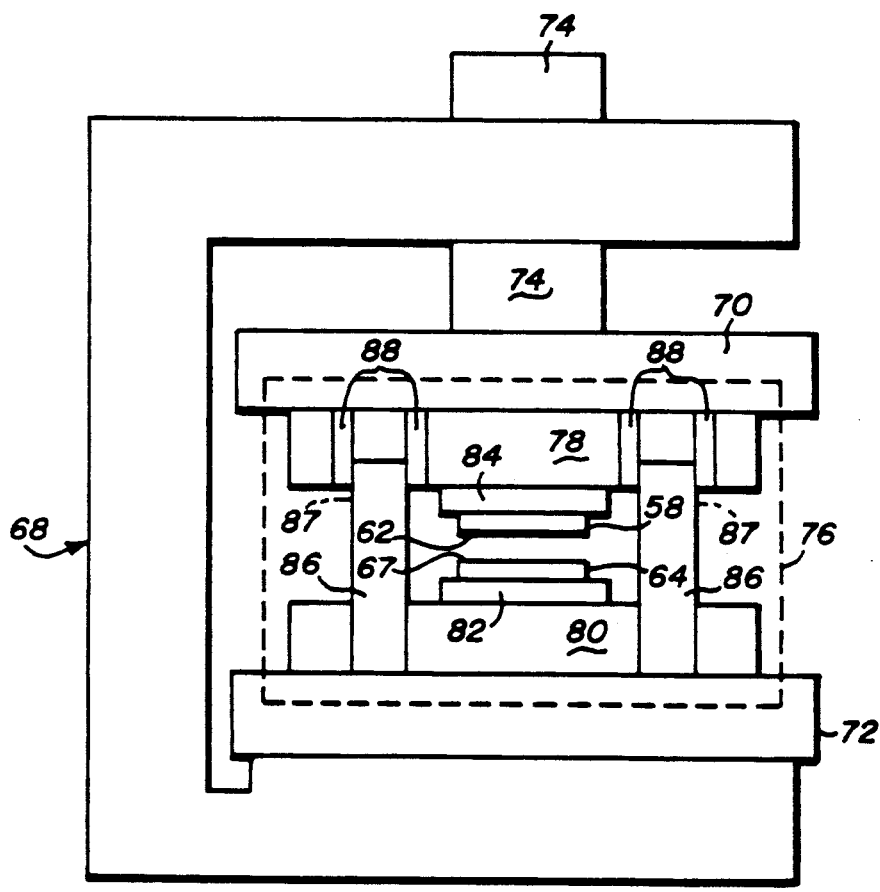
Fig. 4
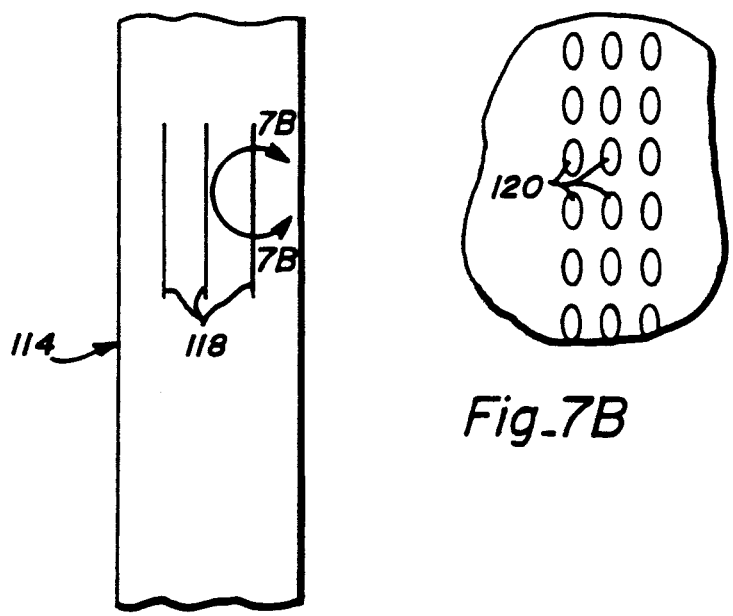
Fig. 7A
Fig. 7B

HIGH TRACK DENSITY MAGNETIC MEDIA WITH PITTED OPTICAL SERVO TRACKS AND METHOD FOR STAMPING THE TRACKS ON THE MEDIA

BACKGROUND OF THE INVENTION

1. Field of the Invention

The present invention relates to information storage media possessing optical servo tracks and a method for stamping the optical servo tracks into the media. More particularly, the media is a magnetic disk media, the optical servo tracks comprise a plurality of pits grouped in concentric rings on the surface of the media and the stamping method involves pressing a stamper disk directly onto the magnetic media under pressure thereby transferring the optical servo track pattern onto the magnetic media.

2. Description of the Prior Art

The track density of magnetic storage disks for conventional floppy disk drives is approximately forty-eight to one hundred thirty-five tracks per inch (TPI). In contrast, optical disk drives are capable of achieving track densities in excess of 15,000 TPI. These higher track densities are achieved through the use of closed loop optical servos that allow the read/write head to follow data track eccentricities caused by defects in the medium and by disturbances from outside forces. In rigid type magnetic disk drives, track densities of up to 2100 TPI are presently used. These drives commonly have multiple disks in which both sides are used for data. To achieve the high track density a dedicated surface of one of the disks is used for magnetic track servo information. This surface is then not usable for data storage. Thus, the total capacity of the drive is lessened. The tracking servo information is also capable of being accidentally erased causing loss of access to all data.

Various techniques have been reported for using optical means for acquiring track following servo information contained on a magnetic recording medium. For example, Ahn, et al., in U.S. Pat. No. 4,633,451, issued on Dec. 30, 1986, for "Optical Servo For Magnetic Disks", discloses the use of a laser diode to read track following servo information in the form of a plurality of spots contained in an optical layer positioned above a magnetic recording layer.

M. Johnson, in U.S. Pat. No. 4,558,383, issued on Dec. 10, 1985, for "Information Storage Disk Transducer Position Control System Using a Prerecorded Servo Pattern Requiring No Alignment With the Storage Disk", discloses a servo apparatus having a sensor for detecting a pattern of spots on a surface of an information storage medium. The spots comprise a dense array of substantially translation invariant marks and separate information recording tracks are detected by measuring the rate at which the spots are detected by the sensor.

J. Cocke, et al., in U.S. Pat. No. 4,587,579, issued on May 6, 1986, for "System for Position Detection on a Rotating Disk", discloses a servo control system comprising a detector for reading a plurality of spiral radial-position-encoding patterns on a medium.

H. Kinjo, et al., in U.S. Pat. No. 4,315,283, issued Feb. 9, 1982, discloses an apparatus for burning a servo pattern comprising a plurality of oval pits into the surface of a medium.

A. S. Hoagland, in "Optical Servo of Magnetic Recording", IBM Technical Disclosure Bulletin, Vol. 20, No. 10, page 4108 (March 1978), suggests a system for achieving optical servo control where a flexible disk medium includes a plurality of optical servo tracks positioned underneath a magnetic layer.

D. A. Thompson, et al., in "Embossed Servo Techniques For Floppy Disks", IERE Conference Proceedings, No. 43, p. 321 (July 1979), discloses the use of embossed marks on magnetic tape media, and dies for making the embossed marks, for obtaining non-magnetic optical or capacitive servo information. The paper suggest that the technique could be applied to floppy disks.

N. Koshino and S. Ogawa, in "Optical Method of the Head Positioning in Magnetic Disk Systems", preprint from *IEEE Transactions on Magnetics* (1980), discloses an optical head for achieving track following servo control which is mounted on the head arm and which includes an LED light source and three optical fibers for delivering light to a medium. The medium comprises a plurality of circular optical tracks, dyed black, and located underneath a magnetic film.

Related work has occurred in the laser video disk area, from which optical disks for digital data storage and the audio laser disk (CD) have evolved. Fundamentally, the optical servo information is inscribed and used in the same way for all these disks. A mastering machine is used to format optical information onto a master disk. The master is then replicated to form the actual disk used by the customer. A laser and associated optics are used to acquire the mastered servo information as well as read data from the disk. The data can be inscribed during the mastering process as with the video and audio disks or it can be written by the read/write laser as in disks for digital information storage.

R. E. Acosta, et al., in "Floppy Disc Embossing For Servo Applications", IBM Technical Disclosure Bulletin, Vol. 21, No. 10 (March 1979), suggests adopting read-only video technology for the servo control of floppy disks. It is suggested that a master die could be used to stamp or emboss a pattern of indentations for servo tracking purposes on a magnetic recording medium. However, no actual stamping method or servo pattern is disclosed.

K. D. Broadbent, in "A Review of the MCA Disco-Vision System", Journal of the SMPTE (1974), describes the laser video mastering technique as well as the servo and read back methods. A master disk is formed by using an argon laser to ablate pits in a metallic layer deposited on a glass plate. The master disk is then coated with photoresist which is exposed through the pits. After washing away the undeveloped photoresist, "bumps" of polymerized photoresist are left over the pits. This paper refers to, but does not disclose, a process for using the master disk to form replicas on a polyethylene terephthalate (Mylar) medium.

Broadbent's paper also states that the master disk can be electrolytically treated to form a stamper tool from which replicas are thermoformed.

J. S. Winslow, in "Mastering and Replication of Reflective Videodiscs", IEEE Transactions on Consumer Electronics, p. 318, November 1976, describes the videodisk mastering technique in further detail.

Similarly, B. Jacobs, in "Laser Beam Recording of Video Master Disks", Applied Optics, Vol. 17, p. 2001 (July 1, 1978), describes the process of making a master disk using a laser to inscribe a pit pattern on a rotating substrate coated with a thin film of photoresist.

An article in OEP, p. 48, May 1987, entitled "Daicel Leads Development of the Optical Memory Disk Supported by Chemical Technology", shows how a stamper disk is used to form an optical disk through an injection molding process.

None of these references disclose a practical method for applying high track density optical servo tracks to a floppy disk type magnetic medium.

SUMMARY OF THE PRESENT INVENTION

It is therefore an object of the present invention to provide a practical method for imprinting high track density optical servo tracks onto a flexible magnetic medium.

It is another object of the present invention to provide a method for imprinting high track density optical servo tracks onto a flexible magnetic medium that improves data reading performance.

It is another object of the present invention to provide a pattern for high track density optical servo tracks that yields a high degree of optical contrast.

Briefly, a preferred embodiment of the present invention comprises a method for imprinting high track density optical servo tracks on a floppy disk which includes the step of pressing a stamper disk, bearing a template of the optical servo track pattern, against the floppy disk, under pressure, preferably in the range of five to ten tons per square inch. Under this amount of pressure, not only is the optical servo track pattern transferred from the stamper disk to the floppy disk, but imperfections on the surface of the floppy disk are also smoothed out (calendered) thus allowing the magnetic read/write head to fly closer to the floppy disk surface which improves data reading performance.

Steps are taken to insure that the surfaces of the stamper disk and the floppy disk are held parallel so that the optical servo track is evenly transferred to the floppy disk. This is accomplished by either holding both the stamper disk and the floppy disk perfectly parallel and flat or by holding one disk rigid and flat and mounting the other disk on a gimbeled platform that allows the platform to tilt so as to conform to the flat-mounted disk.

The preferred pattern for the optical servo tracks comprises a plurality of equally spaced concentric circular rings, with each ring having a different diameter and being comprised of a plurality of small eliptically-shaped pits. The pits are arranged in rows of five with each row extending across the width of the circular ring. A plurality of smooth areas exist around each pit. A data track ring is positioned between every two optical servo tracks.

The pit configuration for the optical servo tracks is chosen because the pits are effective light scatterers that provide the optical servo tracks with sufficient contrast to allow an optical detector to distinguish between the optical servo tracks and the more reflective data tracks.

The stamper disk is constructed in the same manner that stamper disks for use in optical disk manufacturing processes are manufactured. For example, a master disk is formed by applying a uniform layer of negative photoresist to a polished glass substrate. The optical track pit pattern is then constructed by exposing the photoresist at predetermined spots with a laser, a process which leaves "pits" at all the exposed sites after the developed photoresist is washed away. The stamper disk is constructed by electroforming a metal film on the master disk. When the stamper disk is separated from the glass master, it contains a template of the pit pattern in the form of a plurality of "bumps".

The stamper disk is mounted on a stamper disk mount and a conventional floppy disk is mounted on a disk mount. The stamper disk and the floppy disk, with their respective disk mounts, are mounted in a hydraulic press with the surfaces of the stamper disk and floppy disk maintained parallel to each other within $5.0 \times 10^{-5}$ inches. The optical servo track pattern is formed in the floppy disk when the "bumps" in the stamper disk are pressed into the floppy disk surface under pressure. This process differs from conventional compression molding or embossing in that no temperature elevation is utilized in the stamping process of the present invention. The preformed, conventional floppy disks are compressed under pressure at room temperature. By utilizing this process, a large quantity of disks can be stamped in a given unit of time.

An advantage of the present invention is that the optical servo track pattern can be applied directly to a conventional floppy disk.

Another advantage of the present invention is that each stamped disk contains an identical optical servo track pattern.

Another advantage of the present invention is that only a small amount of time is required to stamp the optical servo track pattern o each floppy disk.

Another advantage of the present invention is that the stamping process smooths out the surface of the floppy disk, permitting the read/write heads to fly closer to the surface of the floppy disk.

Another advantage of the present invention is that the optical servo track pattern provides optical contrast that is readily detectable by an optical detector.

These and other objects and advantages of the present invention will no doubt become obvious to those of ordinary skill in the art after having read the following detailed description of the preferred embodiment(s) which are illustrated in the various drawing figures.

IN THE DRAWING

FIG. 1A illustrates a top view (not to scale) of a flexible magnetic disk according to the present invention with the details of the optical servo tracks shown in an exploded segment;

FIG. 1B is an exploded view of the section 1B—1B of FIG. 1A;

FIG. 2 is a partial cross-sectional view of the optical servo track taken along the line 2—2 of FIG. 1;

FIG. 3 is a flow chart illustrating the steps in the method of stamping optical servo tracks on a floppy disk;

FIG. 4 illustrates a side view of a hydraulic press (not to scale);

FIG. 5 illustrates a gimbaled disk mount for use in the method shown in FIG. 3;

FIG. 6A illustrates a template pattern appearing on a stamper for use in forming optical servo tracks;

FIG. 6B is an exploded view of the section 6B—6B of FIG. 6A;

FIG. 7A illustrates a top view of a piece of magnetic tape having a plurality of indelible marks stamped on the tape; and FIG. 7B is an exploded view of the section 7B—7B of FIG. 7A.

DETAILED DESCRIPTION OF THE PREFERRED EMBODIMENT

FIGS. 1A and 1B show a flexible magnetic disk 10 containing a plurality of optical servo tracks 14 and a plurality of data recording areas 18. The optical servo tracks 14 are arranged in equally spaced concentric circles on a surface 22 of the magnetic disk 10. Each of the optical servo tracks 14 are comprised of a plurality of pits 26 shown in the expanded portion of FIG. 1B. In the preferred embodiment, the pits 26 are elliptical in shape and are arranged in a plurality of rows 30, with each row 30 including five of the pits 26. Each row 30 includes a pair of outside pits 32 which mark the beginning and end of a row 30. The number of pits per row or the shape of the pits may vary with the particular use requirements of the magnetic disk 10. The optical servo tracks 14 may also appear on a surface 33 (shown in FIG. 2) positioned on the opposite side of the disk 10 from the surface 22 so that the optical servo tracks 14 appear on both sides of the disk 10.

The flexible magnetic disk 10 is a standard flexible magnetic disk to which the optical servo tracks 14 have been added. The data recording areas 18 are areas on the disk 10 circumscribed on two sides by separate optical servo tracks. Depending on the application, one or more magnetic data tracks can be recorded on each of the data recording areas 18.

An optical head 34, which is not part of the present invention, moves over the surface 22 and follows the optical servo tracks 14. For example, the optical head 34 can include a light source for illuminating the optical servo tracks 14 and a detector for detecting light reflected by the optical servo tracks 14. Optical servo information derived from the light reflected off the optical servo tracks 14 is used to position a magnetic read and/or write transducer 38 over the data recording areas 18 for reading and/or writing magnetic data on the data recording areas 18.

FIG. 2 shows a cross-sectional view of one of the rows 30. The magnetic disk 10 is comprised of a polyethylene terephthalate (Mylar) substrate layer 42 coated with a first magnetic recording layer 44. A second magnetic recording layer 45 is coated on the opposite side of the substrate layer 42 from the first magnetic recording layer 44. In the preferred embodiment, the magnetic recording layers 44 and 45 comprise barium ferrite encapsulated in polymer binders. However, other materials such as γ—ferric oxide or other metals, suspended in other binders, can also be used. The pits 26 are depressed regions in the surface 22. The pits 26 have a depth "d" and a width "w". Typically, the depth "d" is chosen so that the pits 26 do not extend completely through the magnetic recording layer 44. A plurality of smooth regions 46 surround each of the pits 26. The smooth regions 46 reflect light better than the pits 26. With the outside pits 32, the smooth region 46 is continuous with the data recording area 18 as illustrated in FIG. 2. Each row 30 includes five pits and has a width "b". In the preferred embodiment, the depth "d" is approximately 20 microinches, the width "w" is approximately 30 microinches and the width "b" is approximately 180 microinches. The separation between the optical servo tracks 14 ("p" in FIG. 1A) is approximately 800 microinches.

FIG. 3 is a flowchart showing the steps involved in imprinting the optical servo tracks 14 on the magnetic disk 10. A surface 48 of a glass substrate 50 is coated with photoresist and a laser beam is utilized to expose a plurality of spots in the configuration of the pits 26. The photoresist is developed to remove the exposed spots, thus forming a glass master 54 which includes the coating of photoresist containing a plurality of holes 55 where the exposed spots have been removed. The glass master 54 is then plated with a metal coating, such as an eleven mil thick plate of nickel, by an electroforming process, to yield a stamper disk 58 which is then separated from the glass master 54. After the metal stamper disk 58 is separated from the glass master 54, a template 60 comprising a plurality of metal bumps 61 (shown in FIG. 6B) remains on a surface 62 of the stamper disk 58. The metal bumps 62 are formed during the electroplating process when metal is deposited in the holes 55 of the photoresist coating.

The stamper disk 58 and a conventional flexible magnetic (floppy) disk 64, such as a 2.0, 3.5, 5.25 or 8.0 inch floppy disk, are mounted on flat plates and assembled in a conventional press 66. When the floppy disk 64 and the stamper disk 58 are assembled in the press 66, a surface 67 of the floppy disk 64 and the surface 62 of the stamper disk 58, must be parallel. In the preferred embodiment, a 3.5 inch floppy disk conforming to the ANSI specification #X3B/86-57 and having a barium ferrite layer as the magnetic recording layer 44 is utilized as the flexible magnetic disk 64.

FIG. 4 illustrates a one hundred ton hydraulic press 68 which is utilized as the press 66 in the preferred embodiment. Other types of presses, besides hydraulic presses, could be used as the press 66. The hydraulic press 68 comprises an upper press member 70, a lower press member 72 and a hydraulic system 74. A precision die set 76, which comprises a top die plate 78, a die base 80, a flat disk mount 82, a stamper disk mount 84, a first pair of guide pins 86, a second pair of guide pins 87 (not shown) and a plurality of bearings 88, positioned between the upper and lower press members 70 and 72, respectively. The flexible magnetic disk 64 is placed on the flat disk mount 82, which is positioned on the die base 80, and the stamper 58 is positioned on the stamper disk mount 84 which is attached to the top die plate 78. The top die plate 78 and the die base 80 are positioned on the upper and lower press members 70 and 72, respectively. The first pair of guide pins 86 extend from the die base 80 into the top die plate 78 and allow the top die plate 78 to precisely slide down toward the die base 80. The second pair of guide pins 87 function identically to the guide pins 86 and are positioned directly behind the guide pins 86 in FIG. 4 at a distance from the guide pins 86. The plurality of bearings 88 are positioned about the guide pins 86 and 87 for controlling the sliding motion of the top die plate 78 relative to the guide pins 86 and 87. The hydraulic system 74 provides the force for moving the upper and lower press members 70 and 72 together and thus presses the stamper 58 against the floppy disk 64 under pressure, typically in the range of five to ten tons per square inch.

The flat disk mount 82 maintains the surface 67 of floppy disk 64, parallel to the surface 62 by providing a flat, rigid support surface.

FIG. 5 illustrates a gimbaled disk mount 90 that can be used in place of the flat disk mount 82. The gimbaled disk mount 90 comprises an arcuate support member 94 and a flat support member 98. The arcuate support member 94 is positioned on the die base 80 and has an arcuate surface 102. The flat support member 98 rests on and is free to rotate about the arcuate surface 102.

The floppy disk 64 is supported by the flat support member 98 with the surface 67 facing away from flat support member 98.

FIGS. 6A and 6B show the stamper disk 58 in more detail. The expanded view in FIG. 6B shows that the template 60 is comprised of the plurality of raised areas 61 arranged in a plurality of rows 110. The shape of each raised area 61 is curved and has the shape of the pits 26 shown in FIGS. 1B and 2.

The magnetic disk 10 is formed by mounting the stamper disk 58 on the upper member 70 of the hydraulic press 68. The floppy disk 64 is mounted on the flat disk mount 82 (or the gimbaled disk mount 90) and the hydraulic press 68 is closed under approximately nine tons per square inch of pressure forcing the stamper disk 58 and the floppy disk 64 into contact. The raised areas 61 are forced into the surface 67 of the floppy disk 64 thereby creating the pits 26 arranged in the rows 30 corresponding to the template 60. It is believed that the polymer binder in the magnetic layer 44 of the floppy disk 64 is displaced beyond its elastic limit by the stamping action thus yielding a permanent deformation in the form of the pits 26.

In order to transfer the pattern 56 uniformly to the surface 67, it is necessary that the surfaces 67 and 62 be oriented parallel to each other when the press 68 is closed. When the flat disk mount 82 is utilized, the floppy disk 64 and the flat disk mount 82 must be properly aligned with the stamper disk 58 before the press 68 is closed in order to insure the proper parallel relationship. In the preferred embodiment, this alignment is achieved by housing the stamper disk 58 in the precision die set 76 that maintains the surfaces 62 and 67 parallel within $5.0 \times 10^{-5}$ inches. Under these tolerances, the stamper 58 and the floppy disk 64 will comply due to clearances in the bearings 88.

When the gimbaled disk mount 90 is utilized, the flat support member is free to rotate about the arcuate support member 94 in response to force being applied to floppy disk 64 by the stamper disk 58. Thus, the required parallel orientation between the surfaces 62 and 67 is "automatically" achieved with the gimbaled disk mount 90 because the floppy disk 64 aligns to the stamper disk 58 under pressure.

Because fingerprints, scratches and/or particulate contamination on the stamper disk 58 may be replicated into the floppy disk 64, it may be desirable that the stamper disk 58 be maintained in a quality controlled environment such as a clean room. The manufacturing process illustrated in FIG. 3 could be conducted in the clean room.

The optical servo tracks 14 function in the following manner: light is emitted from the optical head 34 and illuminates the surface 22. The data recording areas 18 and the smooth regions 46 are more reflective (reflect light better) than the pits 26. As the optical head 34 scans across the disk 10, the light detector inside the optical head 34 detects regions of high reflectivity (i.e. the data recording areas 18), followed by regions of lower reflectivity (i.e. the optical servo tracks 14). The position of the optical servo tracks 14 is electronically processed to yield servo information for positioning the magnetic head 38 over the data recording areas 18. The lower reflectivity of the optical servo tracks 14 is attributable to the fact that each of the pits 26 scatter light. The optical head 34 detects each optical servo track 14 as a continuous region of lower reflectivity, not as a plurality of pits.

Several advantages result from imprinting the optical servo tracks 14 with the stamping method of the present invention. First, it is estimated that tens of thousands of the flexible magnetic disk 10 can be prepared from a single stamper disk 58. Each of the disks 10 prepared from the same stamper disk 58 will carry identical optical servo tracks 14. Thus, manufacturing precision is increased. Second, the stamping process is very fast, generally taking only five to twenty seconds per disk. Thus, productivity is increased. Third, examination of the flexible magnetic disk 10 before and after application of the optical servo tracks 14 shows that the surface 22 is smoothed (calendered) by the stamping process. It is believed that the pressure of the stamping process crushes irregularities in the surface 22. This permits a magnetic transducer during operation, to fly closer to the surface 22 resulting in enhanced data reading and/or writing characteristics. Fourth, the optical servo tracks are indelible (not easily removed) and thus reduce the possibility that servo information will be lost or destroyed.

It should be noted that the method for stamping indelible marks on the magnetic disk 10 is not limited to flexible magnetic disks. Any type of magnetic medium having a magnetic layer suspended in a polymer binder and coated on a substrate could be utilized. For example, the floppy disk 64 in FIG. 3 could be replaced by a rigid disk such as a Winchester disk.

FIGS. 7A and 7B illustrate the case where a section of magnetic tape 114 replaces the floppy disk 64. A plurality of tracks 118 are stamped on the tape 114. As illustrated in the expanded portion of FIG. 7B, the tracks 118 are comprises of a plurality of pits 120 which are equivalent to the pits 26 shown in FIGS. 1B and 2.

The pits 120 are formed in the tape 114 using a stamper disk bearing a template of the tracks 118 and a stamping method such as was described previously in relation to FIG. 3. The pits 120 are formed by displacing the polymer binder in the magnetic layer of the tape 114 beyond its elastic limit.

Although the present invention has been described in terms of the presently preferred embodiment(s), it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. An information storage device having a magnetic layer suspended in a polymer binder coated on a substrate, comprising:
    a magnetic medium having a flat substrate covered on a first side by a first magnetic coating;
    a plurality of reduced reflectivity areas arranged to function as optical servo tracks on said first side of the magnetic medium, each of the areas having had its reflectivity to light reduced by means to disturb the surface contours of the first magnetic coating; and
    a plurality of areas for recording of magnetic data on said first side of the magnetic medium, substantially all of the individual areas for recording being positioned between each of the reduced reflectivity areas.

2. The device of claim 1, further comprising:

a second magnetic coating covering a second side of the magnetic medium; and a plurality of areas for recording of magnetic data on said second side of the magnetic medium.

3. The device of claim 1 wherein the optical servo tracks on said first surface of the magnetic medium are arranged as concentric equally spaced rings, further comprising:

a second magnetic coating covering a second side of the magnetic medium;

a plurality of reduced reflectivity areas arranged as concentric equally spaced rings on said second side of the magnetic medium, each of the areas having had its reflectivity to light reduced by means to disturb the surface contours of the second magnetic coating; and a plurality of areas for recording of magnetic data on said second side of the magnetic medium, substantially all of the individual areas for recording being positioned between each of the reduced reflectivity areas.

4. The device of claim 1, wherein:

the magnetic medium is a flexible circular diskette comprising a MYLAR substrate and barium ferrite magnetic coatings.

5. The device of claim 1, wherein:

the plurality of reduced reflectivity areas comprise pluralities of pits in the surfaces of said magnetic coatings wherein said pits are each sized and distributed so as to cause a substantial reduction in surface reflectivity of the device to light by scattering any incident light.

6. The device of claim 5, wherein said pits:

generally have a depth that is less than the thickness of said magnetic coating; and are elliptical in shape.

7. The device of claim 6, wherein said pits:

generally have a depth of approximately twenty microinches; and are approximately thirty microinches wide in their minor diameters.

8. The device of claim 5, wherein said pits:

are arranged in rows comprising individual outside pits in each row that mark the beginning and end of the inner and outer edges of an individual concentric ring of reduced reflectivity.

9. The device of claim 1, wherein:

the plurality of reduced reflectivity areas are spaced approximately 800 microinches from one another in said concentric rings and are each 180 microinches wide.

10. A flexible diskette, comprising:

a magnetic medium having a flat circular substrate covered on a first side by a first magnetic coating and covered on a second side by a second magnetic coating;

a plurality of reduced reflectivity areas arranged as equally spaced concentric rings on said first side of the magnetic medium, each of the areas having had its surface reflectivity to light reduced by means to disturb the surface contours of the first magnetic coating; and a plurality of areas for recording for magnetic data on said first side of the magnetic medium, substantially all of the individual areas for recording being positioned between each of the reduced reflectivity areas.

11. A method of manufacturing an information storage device having a plurality of reduced reflectivity areas, comprising the steps of:

coating the surface of a glass substrate with photo-resist;

exposing a pattern of spots in said photo-resist with a laser beam focused at said substrate, said pattern of spots comprise a plurality of spot groupings in concentric circular rings such that the surface reflectivity of the information storage device to light is substantially reduced within the track of each of said rings;

developing said photo-resist to remove said exposed spots wherein a glass master is formed;

plating said glass master with a metal coating wherein a stamper disk having a plurality of metal bumps is formed;

separating said stamper disk from said glass master;

mounting at least one of said stamper disk and at least one flexible magnetic medium in a press with the surfaces of said flexible magnetic mediums and stamper disks parallel to one another;

pressing said flexible magnetic mediums and stamper disks together such that a pattern of spots corresponding to said spots in said photo-resist is put into at least one surface of said flexible magnetic mediums.

12. The method of claim 11, wherein:

said flexible magnetic medium comprises a floppy disk.

13. The method of claim 11, wherein:

said pattern of spots consists of regular numbers of spots arranged in repeating rows.

14. The method of claim 11, wherein:

the pressing comprises using a pressure that peaks between approximately five and nine tons per square inch.

15. The method of claim 11, wherein:

the mounting comprises using a gimbaled disk mount means for automatic parallel alignment of pressure faces such that one of the pressure faces is free to rotate about an arcuate surface.

* * * * *